US010771185B1

United States Patent
Lee et al.

(10) Patent No.: US 10,771,185 B1
(45) Date of Patent: Sep. 8, 2020

(54) SYSTEM AND METHOD FOR SETTING LINK PARAMETERS IN A WIFI LINK

(71) Applicant: Samsung Electronics Co., Ltd., Suwon-si, Gyeonggi-do (KR)

(72) Inventors: Wook Bong Lee, San Jose, CA (US); Moumita Ray, San Jose, CA (US); Ruchen Duan, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/428,695

(22) Filed: May 31, 2019

Related U.S. Application Data (60) Provisional application No. 62/807,544, filed on Feb. 19, 2019.

(51) Int. Cl.
*H04L 1/00* (2006.01)
*H04L 5/00* (2006.01)
*H04B 17/336* (2015.01)
*H04L 1/20* (2006.01)

(52) U.S. Cl.
CPC ......... *H04L 1/0005* (2013.01); *H04B 17/336* (2015.01); *H04L 1/203* (2013.01); *H04L 5/0051* (2013.01); *H04L 5/0055* (2013.01)

(58) Field of Classification Search
CPC ..... H04L 1/0005; H04L 5/0055; H04L 1/203; H04L 5/0051; H04B 17/336
See application file for complete search history.

(56) References Cited

U.S. PATENT DOCUMENTS

| 983,888 | A | 2/1911 | Forssell |
| 9,414,241 | B2 | 8/2016 | Ge et al. |
| 2007/0041322 | A1 | 2/2007 | Choi et al. |
| 2007/0183529 | A1* | 8/2007 | Tujkovic ............... H04L 1/0009 375/267 |

(Continued)

OTHER PUBLICATIONS

Qiuyan Xia, et al., "Practical and Efficient Open-Loop Rate/Link Adaptation Algorithm for High-Speed IEEE 802.11n WLANs", IEEE Symposium on Computers and Communications, Jul. 5, 2009, pp. 661-666.

(Continued)

*Primary Examiner* — Brenda H Pham
(74) *Attorney, Agent, or Firm* — Lewis Roca Rothgerber Christie LLP (57) ABSTRACT

A system and method for operating a link. In some embodiments, the method includes transmitting a first quantity of data, using a first number of spatial streams, and a first bandwidth, receiving N1 acknowledgment signals, N1 being a nonnegative integer; receiving N2 negative acknowledgment signals, N2 being a nonnegative integer; adjusting an estimated signal to interference and noise ratio for the first number of spatial streams and the first bandwidth, based on N1 and N2; estimating a first throughput for the first number of spatial streams and the first bandwidth; estimating a second throughput for a second number of spatial streams and a second bandwidth; determining whether the second throughput exceeds the first throughput; and in response to determining that the second throughput exceeds the first throughput, transmitting a second quantity of data, using the second number of spatial streams, and the second bandwidth.

20 Claims, 6 Drawing Sheets

(56) References Cited

U.S. PATENT DOCUMENTS

| | | |
|---|---|---|
| 2012/0263055 A1 | 10/2012 | Liu et al. |
| 2013/0188630 A1 | 7/2013 | Song et al. |
| 2018/0026741 A1* | 1/2018 | Deng .................... H04W 28/18 370/329 |
| 2018/0332540 A1 | 11/2018 | Lou et al. |

OTHER PUBLICATIONS

Jinyoung Chun, et al., "Link Adaptation for PHY SLS calibration", https://mentor.ieee.org/802.11/dcn/14/11-14-0620-00-00ax-link-adaptation-for-physls-calibration.pptx, doc.: IEEE 802.11-14/0620r0, May 12, 2014, slides 1-14.

* cited by examiner

| | 11b | | 11a | | 11n/11ac CC | | LDPC |
|---|---|---|---|---|---|---|---|
| 0 | 1Mbps | 1.6 | BPSK1/2 | 0.7231 | BPSK1/2 | 0.7231 | -0.8718 |
| 1 | 2Mbps | 3.7 | BPSK3/4 | 3.2941 | QPSK1/2 | 3.7217 | 2.1170 |
| 2 | 5.5Mbps | 4.7 | QPSK1/2 | 3.7217 | QPSK3/4 | 6.2941 | 4.6860 |
| 3 | 11Mbps | 8.5 | QPSK3/4 | 6.2941 | 16QAM1/2 | 9.4290 | 7.5177 |
| 4 | | | 16QAM1/2 | 9.4290 | 16QAM3/4 | 12.6585 | 11.0960 |
| 5 | | | 16QAM3/4 | 12.6585 | 64QAM2/3 | 16.8448 | 15.1047 |
| 6 | | | 64QAM2/3 | 16.8448 | 64QAM3/4 | 18.2178 | 16.4915 |
| 7 | | | 64QAM3/4 | 18.2178 | 64QAM5/6 | 19.5154 | 18.0869 |
| 8 | | | | | 256QAM3/4 | 23.5338 | 21.7146 |
| 9 | | | | | 256QAM5/6 | 25.0347 | 23.5096 |

*FIG. 4*

|  | 11b | 11g/11a | 11n (20MHz) | 11n (40MHz) | 11ac (20MHz) | 11ac (40MHz) | 11ac (80MHz) |
|---|---|---|---|---|---|---|---|
| 1M / 6M / MCS0 | 18 | 16 (BPSK) | 16 (BPSK) | 14 (BPSK) | 15 (BPSK) | 14 (BPSK) | 13 (BPSK) |
| 2M / 9M / MCS1 | 18 | 16 (QPSK) | 16 (QPSK) | 14 (QPSK) | 15 (QPSK) | 14 (QPSK) | 13 (QPSK) |
| 5.5M / 12M / MCS2 | 18 | 16 (QPSK) | 16 (QPSK) | 14 (QPSK) | 15 (QPSK) | 14 (QPSK) | 13 (QPSK) |
| 11M / 18M / MCS3 | 18 | 16 (16QAM) | 16 (16QAM) | 14 (16QAM) | 15 (16QAM) | 14 (16QAM) | 13 (16QAM) |
| 24M / MCS4 |  | 16 (16QAM) | 16 (16QAM) | 14 (16QAM) | 15 (16QAM) | 14 (16QAM) | 13 (16QAM) |
| 36M / MCS5 |  | 14 (64QAM) | 14 (64QAM) | 13 (64QAM) | 13 (64QAM) | 13 (64QAM) | 12 (64QAM) |
| 48M / MCS6 |  | 14 (64QAM) | 14 (64QAM) | 13 (64QAM) | 13 (64QAM) | 13 (64QAM) | 12 (64QAM) |
| 54M / MCS7 |  |  | 14 (64QAM) | 13 (64QAM) | 13 (64QAM) | 13 (64QAM) | 12 (64QAM) |
| MCS8 |  |  |  |  | 13 (256QAM) | 13 (256QAM) | 12 (256QAM) |
| MCS9 |  |  |  |  |  | 13 (256QAM) | 12 (256QAM) |

*FIG. 5*

| | 11b | 11g/a | 11n (20 MHz) CC | 11n (20 MHz) LDPC | 11n (40 MHz) CC | 11n (40 MHz) LDPC | 11ac (20 MHz) CC | 11ac (20 MHz) LDPC | 11ac (40 MHz) CC | 11ac (40 MHz) LDPC | 11ac (80 MHz) CC | 11ac (80 MHz) LDPC |
|---|---|---|---|---|---|---|---|---|---|---|---|---|
| 1M / 6M / MCS0 | 1.75 | 2.75 | 2.75 | 1.25 | 4.75 | 3.25 | 3.75 | 2.25 | 4.75 | 3.25 | 5.75 | 4.25 |
| 2M / 9M / MCS1 | 3.75 | 5.50 | 5.75 | 4.25 | 7.75 | 6.25 | 6.75 | 5.25 | 7.75 | 6.25 | 8.75 | 7.25 |
| 5.5M / 12M / MCS2 | 4.75 | 5.75 | 8.50 | 6.75 | 10.50 | 8.75 | 9.50 | 7.75 | 10.50 | 8.75 | 11.50 | 9.75 |
| 11M / 18M / MCS3 | 8.50 | 8.50 | 11.50 | 9.75 | 13.50 | 11.75 | 12.50 | 10.75 | 13.50 | 11.75 | 14.50 | 12.75 |
| 24M / MCS4 | | 11.50 | 14.75 | 13.25 | 16.75 | 15.25 | 15.75 | 14.25 | 16.75 | 15.25 | 17.75 | 16.25 |
| 36M / MCS5 | | 14.75 | 21.00 | 19.25 | 22.00 | 20.25 | 23.00 | 21.25 | 22.00 | 20.25 | 23.00 | 21.25 |
| 48M / MCS6 | | 21.00 | 22.25 | 20.50 | 23.25 | 21.50 | 24.25 | 22.50 | 23.25 | 21.50 | 24.25 | 22.50 |
| 54M / MCS7 | | 22.2 | 23.5 | 22.25 | 24.50 | 23.25 | 25.50 | 24.25 | 24.50 | 23.25 | 25.50 | 24.25 |
| MCS8 | | | | | | | 29.50 | 27.75 | 28.50 | 26.75 | 29.50 | 27.75 |
| MCS9 | | | | | | | | 23.50 | 30.00 | 28.50 | 31.00 | 29.50 |

*FIG. 6*

SYSTEM AND METHOD FOR SETTING LINK PARAMETERS IN A WIFI LINK

CROSS-REFERENCE TO RELATED APPLICATION(S)

The present application claims priority to and the benefit of U.S. Provisional Application No. 62/807,544, filed Feb. 19, 2019, entitled "SYSTEM AND METHOD FOR ENHANCED OPEN LOOP LINK ADAPTATION", the entire content of which is incorporated herein by reference.

FIELD

One or more aspects of embodiments according to the present disclosure relate to wireless communications, and more particularly to a system and method for setting link parameters in a WiFi link.

BACKGROUND

In a WiFi system, various parameters may be adjusted when data are transmitted. These parameters include the modulation coding scheme, the number of spatial streams and the bandwidth. The throughput of a WiFi link may depend on the channel and on the parameters chosen, and, as such, it may be advantageous to use link adaptation, e.g., to adapt the parameters to the operating conditions of the link.

Thus, there is a need for a system and method for setting link parameters in a WiFi link.

SUMMARY

According to some embodiments of the present disclosure, there is provided a method for operating a link, the method including: adjusting a respective estimated signal to interference and noise ratio for each of a plurality of combinations of spatial stream numbers and bandwidths; determining a modulation and coding scheme for each of the plurality of combinations; estimating a plurality of throughputs, each corresponding to a respective one of the plurality of modulation and coding schemes; selecting a maximum throughput from the plurality of throughputs; and transmitting data according to the modulation and coding scheme, spatial stream number, and bandwidth associated with the maximum throughput.

In some embodiments, the adjusting of the respective estimated signal to interference and noise ratio for a first combination of the plurality of combinations of spatial stream numbers and bandwidths includes: transmitting a first quantity of data, using the first combination; receiving N1 acknowledgment signals, N1 being a nonnegative integer; receiving N2 negative acknowledgment signals, N2 being a nonnegative integer; and adjusting an estimated signal to interference and noise ratio for the first combination, based on N1 and N2.

In some embodiments, the adjusting of the estimated signal to interference and noise ratio includes: adding, to a previously estimated signal to interference and noise ratio for the first combination, an adjustment based on an estimated error rate, the adjustment being: greater than zero when the estimated error rate is zero, and less than zero when the estimated error rate is one.

In some embodiments: the number of spatial streams of a second combination of the plurality of combinations of spatial stream numbers and bandwidths, exceeds the number of spatial streams of the first combination, or the bandwidth of the second combination exceeds the bandwidth of the first combination, and the estimating of the throughput corresponding to the modulation and coding scheme of the second combination includes adjusting an estimated signal to interference and noise ratio for the second combination, the adjusting of the estimated signal to interference and noise ratio for the second combination includes adding, to a previously estimated signal to interference and noise ratio for the second combination, the adjustment based on the estimated error rate.

In some embodiments: the previously estimated signal to interference and noise ratio for the first combination is a sum of: a first reference signal to interference and noise ratio, and an offset; and the adding of the adjustment to the previously estimated signal to interference and noise ratio for the first combination includes adding the adjustment to the offset.

In some embodiments, the method further includes calculating the first reference signal to interference and noise ratio based on a signal to interference and noise ratio measured during reception of a beacon signal.

In some embodiments, the calculating of the adjustment includes: determining whether: the estimated error rate is less than a target error rate, a current modulation coding scheme is equal to a maximum modulation coding scheme, and the offset exceeds a first threshold; and in response to determining that: the estimated error rate is less than the target error rate, the current modulation coding scheme is equal to the maximum modulation coding scheme, and the offset exceeds the first threshold, setting the adjustment to zero.

In some embodiments, the calculating of the adjustment includes: determining whether: the estimated error rate is greater than a target error rate, a current modulation coding scheme is equal to a minimum modulation coding scheme, and the offset is less than a second threshold; and in response to determining that: the estimated error rate is greater than the target error rate, the current modulation coding scheme is equal to the minimum modulation coding scheme, and the offset is less than the second threshold, setting the adjustment to zero.

In some embodiments, the adjustment is calculated according to $(1-PER)*snrStep/(1/targetPer-1)+PER*(-snrStep)$, wherein: PER is the estimated error rate, targetPer is a target error rate, and snrStep is an adjustment rate parameter.

In some embodiments, the estimated error rate is calculated as $N2/(N1+N2)$.

In some embodiments, the target error rate is calculated based on a number of consecutive errors.

According to some embodiments of the present disclosure, there is provided a system including a WiFi transmitter including a processing circuit, the processing circuit being configured to: adjust a respective estimated signal to interference and noise ratio for each of a plurality of combinations of spatial stream numbers and bandwidths; determine a modulation and coding scheme for each of the plurality of combinations; estimate a plurality of throughputs, each corresponding to a respective one of the plurality of modulation and coding schemes; select a maximum throughput from the plurality of throughputs; and transmit data according to the modulation and coding scheme, spatial stream number, and bandwidth associated with the maximum throughput.

In some embodiments, the adjusting of the respective estimated signal to interference and noise ratio for a first combination of the plurality of combinations of spatial stream numbers and bandwidths includes: transmitting a first quantity of data, using the first combination; receiving N1 acknowledgment signals, N1 being a nonnegative integer; receiving N2 negative acknowledgment signals, N2 being a nonnegative integer; and adjusting an estimated signal to interference and noise ratio for the first combination, based on N1 and N2.

In some embodiments, the adjusting of the estimated signal to interference and noise ratio includes: adding to a previously estimated signal to interference and noise ratio an adjustment based on an estimated error rate, the adjustment being: greater than zero when the estimated error rate is zero, and less than zero when the estimated error rate is one.

In some embodiments: the number of spatial streams of a second combination of the plurality of combinations of spatial stream numbers and bandwidths, exceeds the number of spatial streams of the first combination, or the bandwidth of the second combination exceeds the bandwidth of the first combination, and the estimating of the throughput corresponding to the modulation and coding scheme of the second combination includes adjusting an estimated signal to interference and noise ratio for the second combination, the adjusting of the estimated signal to interference and noise ratio for the second combination includes adding, to a previously estimated signal to interference and noise ratio for the second combination, the adjustment based on the estimated error rate.

In some embodiments: the previously estimated signal to interference and noise ratio for the first combination is a sum of: a first reference signal to interference and noise ratio, and an offset; and the adding of the adjustment to the previously estimated signal to interference and noise ratio for the first combination includes adding the adjustment to the offset.

In some embodiments, the processing circuit is further configured to calculate the first reference signal to interference and noise ratio based on a signal to interference and noise ratio measured during reception of a beacon signal.

In some embodiments, the calculating of the adjustment includes: determining whether: the estimated error rate is less than a target error rate, a current modulation coding scheme is equal to a maximum modulation coding scheme, and the offset exceeds a first threshold; and in response to determining that: the estimated error rate is less than the target error rate, the current modulation coding scheme is equal to the maximum modulation coding scheme, and the offset exceeds the first threshold, setting the adjustment to zero.

In some embodiments, the calculating of the adjustment includes: determining whether: the estimated error rate is greater than a target error rate, a current modulation coding scheme is equal to a minimum modulation coding scheme, and the offset is less than a second threshold; and in response to determining that: the estimated error rate is greater than the target error rate, the current modulation coding scheme is equal to the minimum modulation coding scheme, and the offset is less than the second threshold, setting the adjustment to zero.

According to some embodiments of the present disclosure, there is provided a system including a WiFi transmitter including means for processing, the means for processing being configured to: transmit a first quantity of data, using a first number of spatial streams, and a first bandwidth; receive N1 acknowledgment signals, N1 being a nonnegative integer; receive N2 negative acknowledgment signals, N2 being a nonnegative integer; adjust an estimated signal to interference and noise ratio for the first number of spatial streams and the first bandwidth, based on N1 and N2; estimate a first throughput for the first number of spatial streams and the first bandwidth; estimate a second throughput for a second number of spatial streams and a second bandwidth; determine whether the second throughput exceeds the first throughput; and in response to determining that the second throughput exceeds the first throughput, transmit a second quantity of data, using the second number of spatial streams, and the second bandwidth.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for setting link parameters in a WiFi link provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
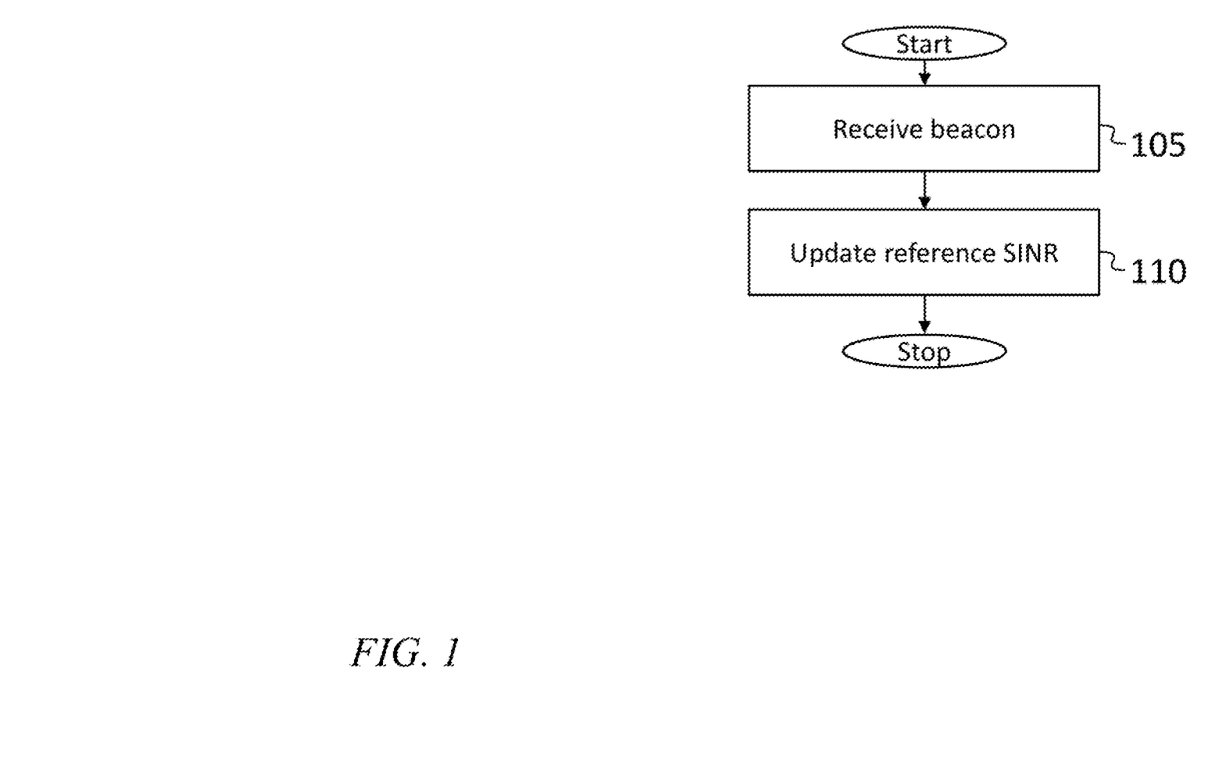
FIG. 1 is a flowchart for a portion of a method for setting link parameters in a WiFi link, according to an embodiment of the present disclosure.

FIG. 1 is a flowchart for a portion of a method for setting link parameters in a WiFi link, according to an embodiment of the present disclosure. Referring to FIG. 1, in some embodiments, a method for setting link parameters in a WiFi link begins with setting, for each combination of (i) the number of spatial streams to be transmitted, and (ii) the transmission bandwidth, a reference signal to interference and noise ratio, as discussed in further detail below, forming a table, for example. For example, a beacon signal may be received (at 105), and a reference signal to interference and noise ratio may be calculated (at 110) based on the signal to interference and noise ratio measured for the beacon. As used herein, "signal to interference and noise ratio" may be abbreviated to "SINR", "SNR", "snr", or "Snr". The calculating of the reference signal to interference and noise ratio may include adjusting the signal to interference and noise ratio value to 20 MHz for adaptive bandwidth allocation and for adaptive number of spatial streams, as follows:

$$\text{refSnrLinear}(Nss,BW)=(\text{snr of Beacon}*2^{BW-1})*(\text{Maximum } Nss)/Nss$$

$$\text{saving refSnr}(Nss,BW)=10*\log 10(\text{refSnrLinear}(Nss,BW)).$$

Where Maximum Nss is maximum number of supported spatial streams at the device, Nss is number of spatial stream, and BW represents bandwidth index.

Figure 2:
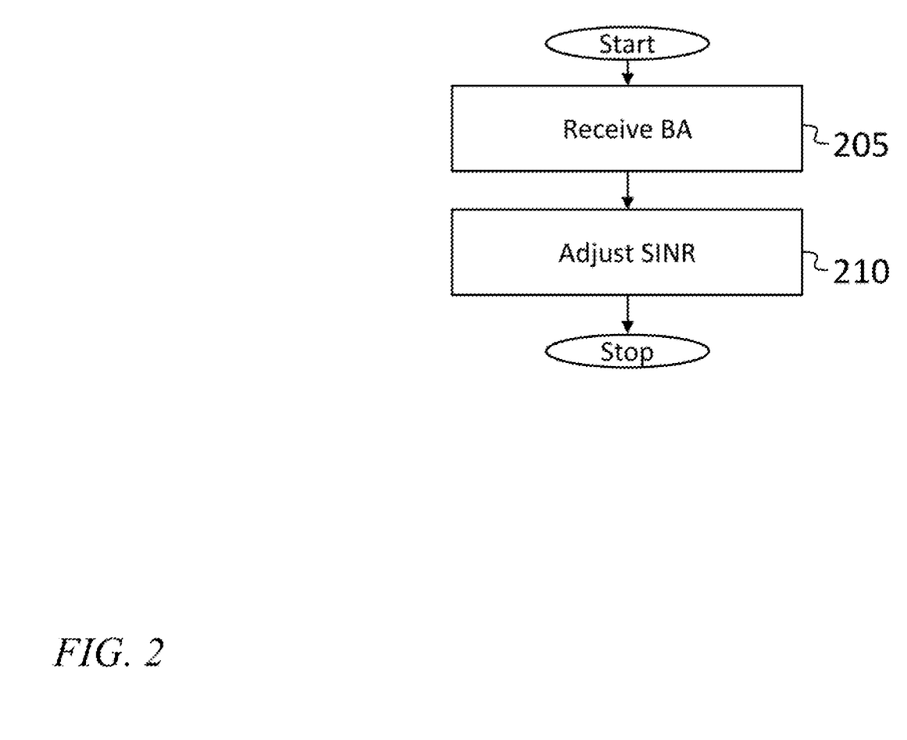
FIG. 2 is a flowchart for a portion of a method for setting link parameters in a WiFi link, according to an embodiment of the present disclosure.

FIG. 2 is a flowchart for a portion of a method for setting link parameters in a WiFi link, according to an embodiment of the present disclosure. Referring to FIG. 2, an adjustment may be formed, based on acknowledgment signals and negative acknowledgment signals received (as part of a block acknowledgement (BA), at 205), in response to transmitted signals, with the estimated signal to interference and noise ratio, for the current combination of the number of spatial streams and the transmission bandwidth, generally being adjusted upwards when the acknowledgment signals and negative acknowledgment signals indicate a low packet error rate, and generally being adjusted downwards when the acknowledgment signals and negative acknowledgment signals indicate a high packet error rate. The method may then add an adjustment (at 210) to some (or all) of the reference signal to interference and noise ratios, to form a table of estimated signal to interference and noise ratios, as discussed in further detail below. In some cases, exceptions to the above-described adjustment process are made, as discussed in further detail below, to avoid the method becoming "stuck" at one combination of the number of spatial streams and the transmission bandwidth in certain circumstances.

Figure 3:
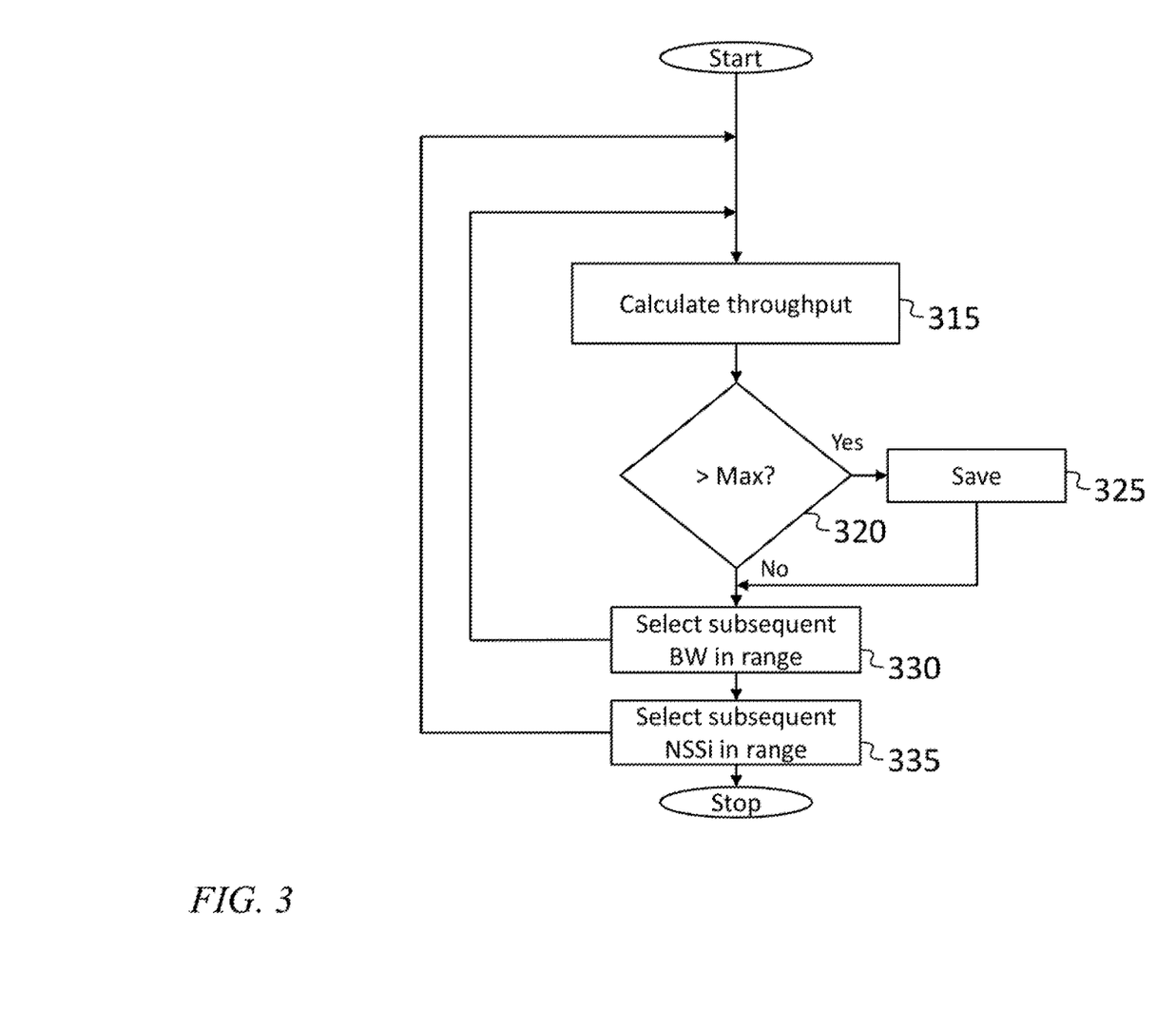
FIG. 3 is a flowchart for a portion of a method for setting link parameters in a WiFi link, according to an embodiment of the present disclosure.

FIG. 3 is a flowchart for a portion of a method for setting link parameters in a WiFi link, according to an embodiment of the present disclosure. Once a table of estimated signal to interference and noise ratios is available (having been generated using the methods of FIGS. 1 and 2), the method may proceed as illustrated in FIG. 3, to identify the number of spatial streams, bandwidth, and modulation coding scheme to be used for a transmission. Before the transmission starts, the throughput is calculated for each combination of the number of spatial streams and the transmission bandwidth. This calculation is performed within two nested loops, including an outer loop (at 315 through 335) that iterates over all values of the number of spatial streams, and an inner loop (at 315 through 330) that iterates over all values of the bandwidth. A subsequent bandwidth and a subsequent Nss are selected (at 330 and 335, respectively) at each iteration of the inner and outer loops, respectively. The throughput is calculated, at 315, for each combination of the number of spatial streams and the transmission bandwidth, and compared to a greatest value found so far.

$$\text{SINReff}(Nss,BW)=\text{refSnr}(Nss,BW)+\text{deltaSnr}(Nss,BW)$$

and maximum MCS may then be obtained based on SINReff.

If the current value exceeds, at 320, the previously found maximum throughput, then the current, newly found, maximum value of the throughput is saved, at 325, along with the corresponding values of the number of spatial streams and the bandwidth.

Figure 4:
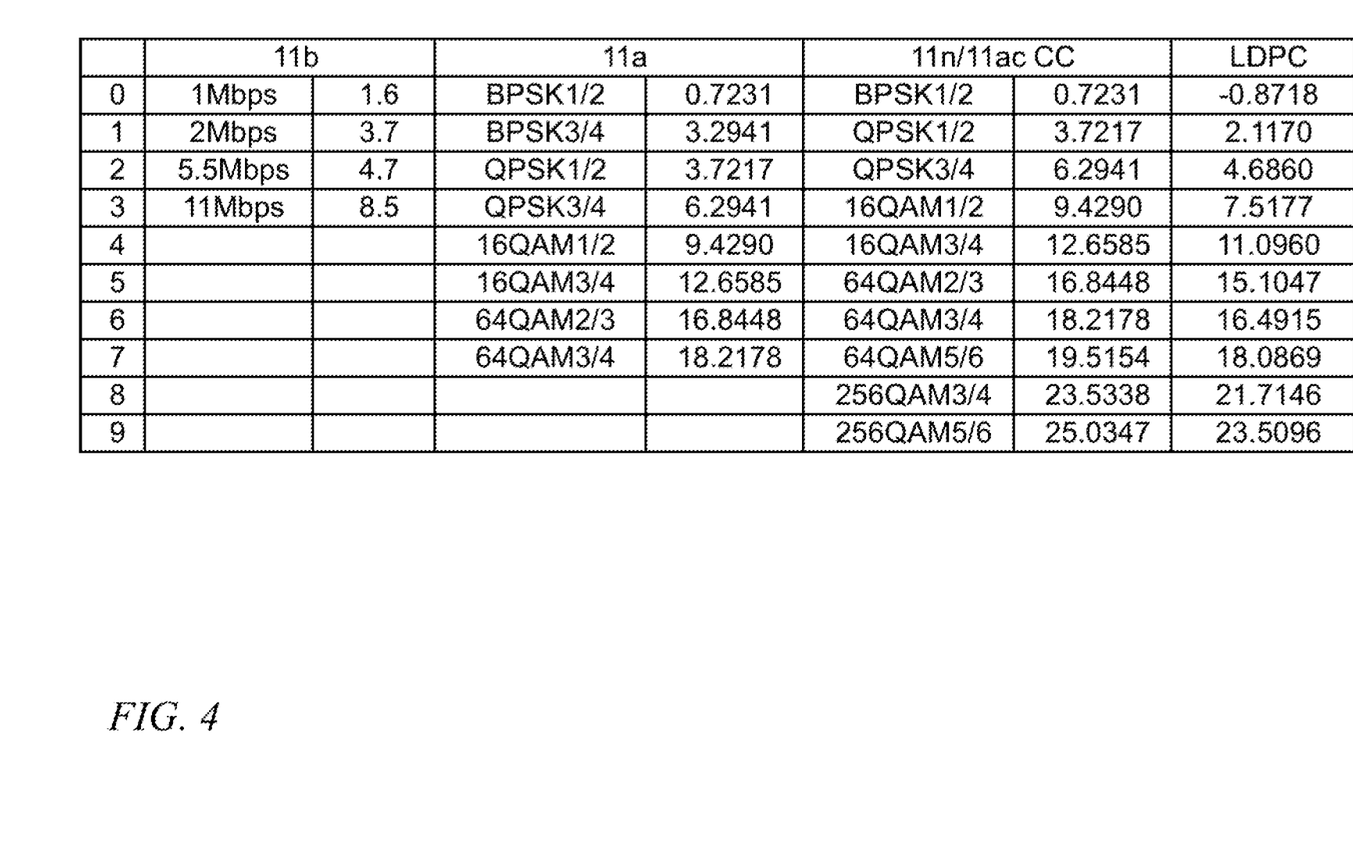
FIG. 4 is a table of signal to interference and noise ratio (in dB) required for various modes of operation, for a 1458 byte packet size, according to an embodiment of the present disclosure.

The calculating of the throughput, for each iteration of the inner loop, may be performed as follows. For a combination of the number of spatial streams and the transmission bandwidth, the estimated signal to interference and noise ratio may be obtained from the table of estimated signal to interference and noise ratios generated according to the method of FIG. 2. FIG. 4 is a table of signal to interference and noise ratio (in dB) required for various modes of operation, for a 1458 byte packet size, according to an embodiment of the present disclosure. The estimated signal to interference and noise ratio may be used to identify the maximum modulation coding scheme that may be used, using the table of FIG. 4; once the modulation coding scheme has been selected, the throughput may be calculated, based on the modulation coding scheme, the number of spatial streams, the transmission bandwidth. In the table of FIG. 4, the first (left-most) column contains the index of modulation coding scheme; the third, fifth, and seventh columns contain the signal to interference and noise ratio (in dB) required for the modulation coding scheme shown in the first column if convolutional code (CC) is used, and the modulation coding schemes shown in the second, fourth, and sixth columns, respectively. The eighth column shows the signal to interference and noise ratio (in dB) required for the modulation and coding scheme shown in the first column if low-density parity-check (LDPC) code is used.

Some embodiments of the present disclosure try to maintain a target packet error rate (PER) by estimating an effective signal to interference and noise ratio (SINReff) (which may be referred to herein as an "estimated signal to interference and noise ratio"). In some embodiments the method begins from a reference SINR, and adjusts an estimated signal to interference and noise ratio (SINR) based on a delta signal-to-noise ratio (delta SNR), which may in turn be based on acknowledgement (ACK) and negative acknowledgement (NACK) signals of a transmitted packet.

In some embodiments, different numbers of spatial streams (Nss, e.g., different ranks) and different bandwidths (BW, e.g., 20 MHz, 40 MHz, 60 MHz, and 80 MHz bandwidths) may have different SINReff that can be estimated separately.

In operation, the system may calculate an estimated signal to interference and noise ratio for each possible combination of (i) the number of spatial streams and (ii) the bandwidth, as follows:

$$\text{SINReff}(Nss,BW)=\text{refSnr}(Nss,BW)+\text{deltaSnr}(Nss,BW)$$

where refSnr(Nss,BW) is a reference signal to interference and noise ratio (discussed in further detail below), and deltaSnr(Nss,BW) is an offset that is periodically updated.

When acknowledgment signals and negative acknowledgment signals are received, the system may adjust the estimated signal to interference and noise ratio, for the number of spatial streams and the bandwidth currently being used, based on the number of acknowledgment signals and on the number of negative acknowledgment signals received. For example, the AMPDU (Aggregated MAC Protocol Data Unit) Tx Status may be evaluated to calculate a current PER (packet error rate) based on a number of successful MPDUs (MAC Protocol Data Units) and a number of failed MPDUs. For example, the system may adjust the offset according to the equation:

$$\text{deltaSnr}(Nss,BW)+=(1-\text{PER})*\text{snrStep}/(1/\text{targetPer}-1)+\text{PER}*(-\text{snrStep}),$$

(i.e., an adjustment equal to (1−PER)*snrStep/(1/targetPer−1)+PER*(−snrStep) may be added to the offset), where Nss is an index for the transmitted number of streams, BW is an index for the transmitted bandwidth, snrStep is an SNR step size (which acts as an adjustment rate parameter) (which may be set to 2 dB), targetPer is a target packet error rate (or "target error rate") (e.g. 10%), and PER is an error rate (or an "estimated error rate") (e.g., a packet error rate)

which may be based on the current packet from BA. If the current packet includes only one media access control (MAC) protocol data unit (MPDU), then the packet error rate may be 1 or 0. In some embodiments, use of the above equation may result in frequent changes of modulation coding scheme. This effect may be reduced by using, instead of a constant targetPer, the following:

$$targetPer(X)=(8-X)/(56+X),$$

where X is a number of consecutive errors.

In some embodiments, the offset may be adjusted only for the number of spatial streams and the bandwidth currently being used, and for certain other combinations of the number of spatial streams and the bandwidth, (e.g., for (Nss+1,BW) and for (Nss,BW+1), as discussed in further detail below). For other combinations of the number of spatial streams and the bandwidth, the offset may remain the same, or no adjustment may be added to the offset.

In some embodiments, it may be desirable to limit the maximum and minimum values deltaSnr may take. In some embodiments, the method implements a restriction not to increase deltaSnr when (i) the packet error rate is less than the target error rate (ii), the current modulation coding scheme (MCS) is equal to the maximum modulation coding scheme, and (iii) the offset (deltaSnr) exceeds a first threshold; the adjustment may be set to zero in this circumstance.

Similarly, the method may implement a restriction not to decrease deltaSnr when (i) the packet error rate is greater than the target error rate, (ii) the current modulation coding scheme (MCS) is equal to the minimum modulation coding scheme, and (iii) the offset (deltaSnr) is less than a second threshold (less than the first threshold, e.g., less than zero); the adjustment may also be set to zero in this circumstance.

When the reference signal to interference and noise ratio is underestimated, it may be possible for the number of spatial streams to become "stuck", i.e., for the number of spatial streams used to remain unchanged even though a larger number of spatial streams may provide better performance. In some embodiments, to avoid this behavior, the offset for the next higher number of spatial streams (deltaSnr (Nss+1,BW)) may be increased when (i) the packet error rate is less than the target error rate and (ii) the current modulation coding scheme exceeds a certain MCS (e.g., MCS 7).

When the reference signal to interference and noise ratio for a certain bandwidth is not correctly estimated, then, in some embodiments, it may be adjusted. In order to change from an incorrect bandwidth, when the bandwidth is less than the bandwidth of the basic service set (BSS), the present system may increase the offset for the next higher bandwidth (deltaSnr(Nss,BW+1)) when (i) the packet error rate is less than the target error rate and (ii) the current MCS is greater than a certain MCS (e.g. MCS 7). The bandwidth of the BSS may be the maximum bandwidth that can be used with the AP. The AP may set its maximum bandwidth to be used for operation. It may change the BSS bandwidth by updating it and informing it through the beacon.

The reference signal to interference and noise ratio (refSnr(Nss,BW)) may be a stored signal to interference and noise ratio that may be updated by feedback or measured during previous data reception. For example, acknowledgement signals (ACK), request to send (RTS) signals, clear to send (CTS) signals, or a beacon signal may be used to determine the reference signal to interference and noise ratio. For example, a beacon signal may be employed by a non-access point station (non-AP STA). The uplink SINR may be the relevant information, but it may be information that the non-AP STA does not have direct access to. Accordingly, the uplink SINR may be estimated based on the reference SNR and the delta SNR. As such, the reference SNR may be a starting point and the delta SNR an adjustment to it.

If all interference levels are similar for the operating bandwidth or if a non-AP STA does not have the capability to measure the signal to interference and noise ratio per 20 MHz bandwidth, then refSnr(Nss,1) may be derived from 20 MHz reference signal to interference and noise ratio (if this is measured from the beacon), and the reference signal to interference and noise ratio may be reduced by 3 dB or 6 dB each, as the bandwidth is increased to 40 MHz or 80 MHz, respectively. If the non-AP STA is capable of measuring the signal to interference and noise ratio per 20 MHz bandwidth, and if narrow band interference from overlapping basic service sets (OBSS) may be present, the reference signal to interference and noise ratio may be measured and stored for different bandwidths. This may be accomplished by measuring the beacon signal to interference and noise ratio, using it as the primary 20 MHz signal to interference and noise ratio, and averaging the detected received signal strength indicator (RSSI) level per 20 MHz bandwidth. This may be accomplished during a per 20 MHz clear channel assessment energy detected (CCA-ED) measurement, when the primary 20 MHz is idle. Letting RSSI1 (NI1) be the RSSI measured for the primary 20 MHz when it is idle, letting refSnr(Nss,1) be the signal to interference and noise ratio for the beacon, and letting RSSIi(NIi) be the RSSI measured for the i-th 20 MHz band, the following may be derived:

$$refSnr(Nss,1)=Ptx(\text{dBm})+PL(\text{dBm})-NI1$$

$$Ptx(\text{dBm})+PL(\text{dBm})=refSnr(Nss,1)+NI1$$

$$Sinr\_i=refSnr(Nss,1)+NI1-NIi$$

Then, the primary 20 MHz/40 MHz/80 MHz refSnr may be obtained using the following.

For 20 MHz:

$$refSnr(Nss,1)=refSnr\_Beacon,$$

for 40 MHz:

$$refSnr(Nss,2)=pow2db((db2pow(refSnr(Nss,1))+db2pow(\text{Sinr}\_2))/4), \text{ and}$$

for 80 MHz:

$$pow2db((db2pow(refSnr(Nss,1))+db2pow(\text{Sinr}\_2)+db2pow(\text{Sinr}\_3)+db2pow(\text{Sinr}\_4)))/16), \text{respectively.}$$

In some embodiments, NIi may be measured using a moving average so that it can capture current load information.

In some embodiments, downlink and uplink performance may differ from each other. Also, different ranks (i.e., different numbers of spatial streams) may have different values for the reference signal to interference and noise ratio. Even though a method according to some embodiments may converge without adjustment (except when conditions are at an extreme of good or bad conditions), some embodiments may estimate a closer value based on available information such as a number of antennas and a transmit power level. In one embodiment, the present system and method includes adjusting a refSnr for different numbers of spatial streams when a reference signal to interference and noise ratio is available or estimated. A geometry signal to interference and noise ratio may be obtained from received signal strength, using, for example, the following relations:

refSnr(1)=geoSnr,then refSnr(*Nss*)=refSnr(1)+
pow2*db*(max((*Nrx*−*Nss*+1)/*Nss*,1)).

After determining an effective signal to interference and noise ratio, some embodiments may estimate the packet error rate for each MCS (e.g., using PHY abstraction), and thus the expected throughput accordingly. Then, a transmitter may select the BW, MCS and Nss that is expected to result in the greatest throughput.

Figure 5:
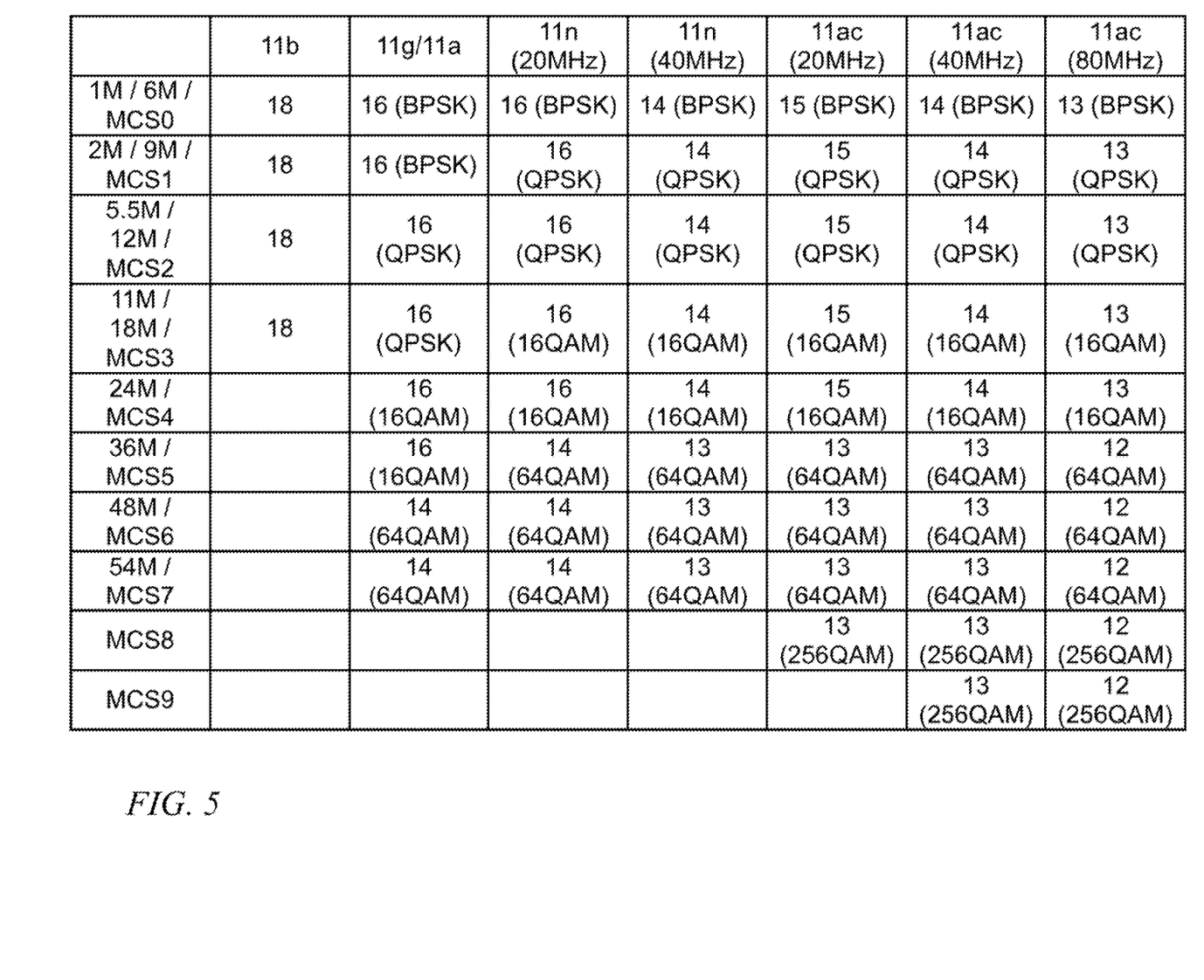
FIG. 5 is a table of transmit power level for different modes of operation, according to an embodiment of the present disclosure.
Figure 6:
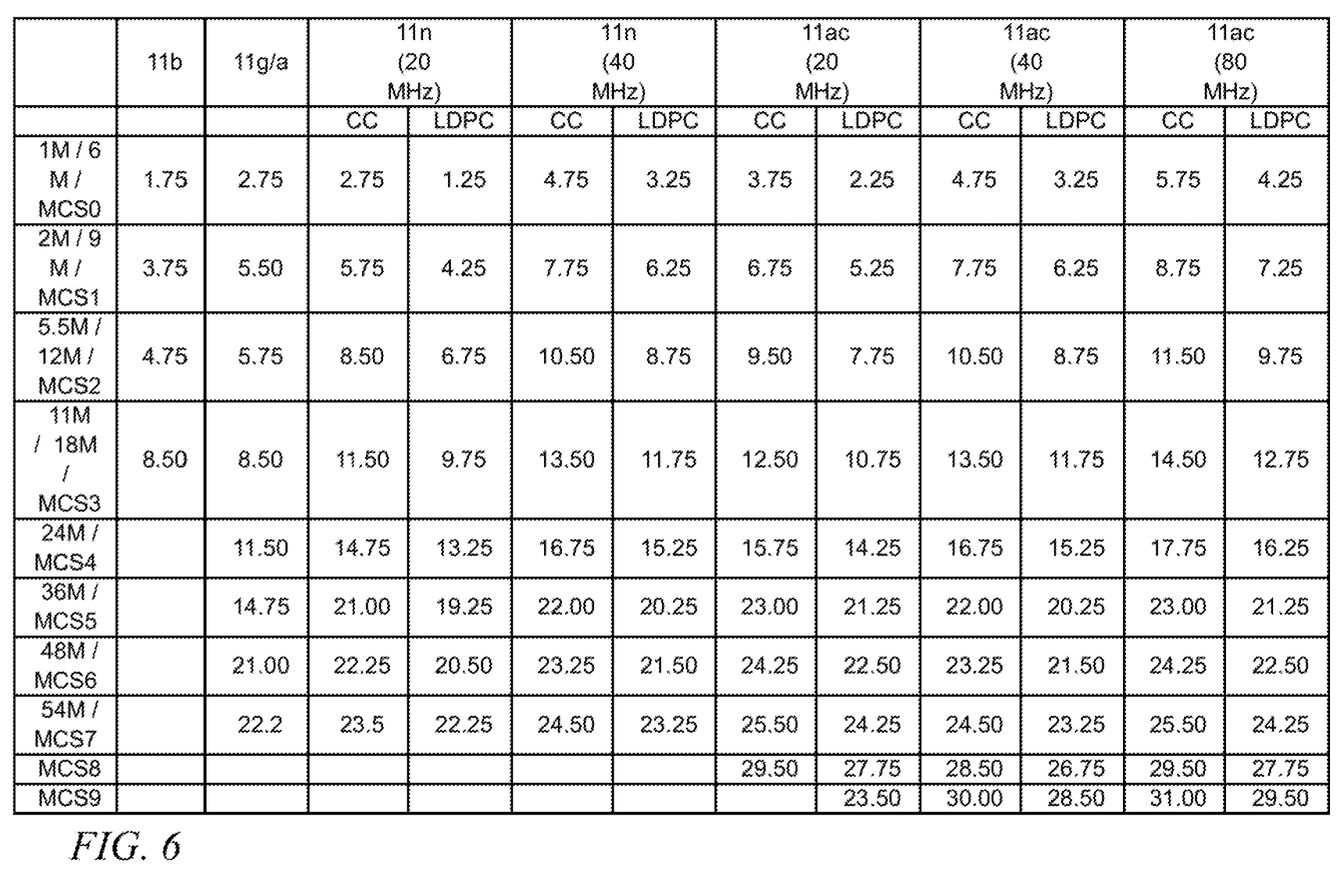
FIG. 6 is a table of signal to interference and noise ratio (in dB) required for various modes of operation, taking into account transmit power differences, according to an embodiment of the present disclosure.

FIG. 5 is a table of transmit power level for different modes of operation, according to an embodiment of the present disclosure. According to one embodiment, the present system may transmit different power levels to meet an error vector magnitude (EVM) requirement, as transmit power for different bandwidths, different modulation levels, and different PHY modes may be different, as shown in FIG. 5. FIG. 6 is a table of signal to interference and noise ratio (in dB) required for various modes of operation, taking into account such transmit power differences, according to an embodiment of the present disclosure. For example, in some embodiments, the present system may handle different transmit power levels by adjusting the reference signal to interference and noise ratio by −1 dB for a bandwidth of 40 MHz, adjusting the reference signal to interference and noise ratio by −2 dB for a bandwidth of 80 MHz, and adding −1 dB for reference curves above 64QAM modulation level, for example to compensate for the difference between MCS5 and MCS9.

In some embodiments, a processing circuit may perform the methods of some embodiments, or portions of such methods. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of some embodiments.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of some embodiments. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing some embodiments refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

As used herein, the term "or" should be interpreted as "and/or", such that, for example, "A or B" means any one of "A" or "B" or "A and B"

Although exemplary embodiments of a system and method for setting link parameters in a WiFi link have been specifically described and illustrated herein, many modifications and variations will be apparent to those skilled in the art. Accordingly, it is to be understood that a system and method for setting link parameters in a WiFi link constructed according to principles of this disclosure may be embodied other than as specifically described herein. Some embodiments are also defined in the following claims, and equivalents thereof.

What is claimed is:

1. A method for operating a link, the method comprising:
   adjusting a respective estimated signal to interference and noise ratio for each of a plurality of combinations of spatial stream numbers and bandwidths;
   determining a modulation and coding scheme for each of the plurality of combinations;
   estimating a plurality of throughputs, each corresponding to a respective one of the plurality of modulation and coding schemes;
   selecting a maximum throughput from the plurality of throughputs; and
   transmitting data according to the modulation and coding scheme, spatial stream number, and bandwidth associated with the maximum throughput.

2. The method of claim 1, wherein the adjusting of the respective estimated signal to interference and noise ratio for a first combination of the plurality of combinations of spatial stream numbers and bandwidths comprises:
   transmitting a first quantity of data, using the first combination;
   receiving N1 acknowledgment signals, N1 being a nonnegative integer;
   receiving N2 negative acknowledgment signals, N2 being a nonnegative integer; and
   adjusting an estimated signal to interference and noise ratio for the first combination, based on N1 and N2.

3. The method of claim 2, wherein the adjusting of the estimated signal to interference and noise ratio comprises:
   adding, to a previously estimated signal to interference and noise ratio for the first combination, an adjustment based on an estimated error rate,
   the adjustment being:
      greater than zero when the estimated error rate is zero, and
      less than zero when the estimated error rate is one.

4. The method of claim 3, wherein:
   the number of spatial streams of a second combination of the plurality of combinations of spatial stream numbers and bandwidths, exceeds the number of spatial streams of the first combination, or
   the bandwidth of the second combination exceeds the bandwidth of the first combination, and
   the estimating of the throughput corresponding to the modulation and coding scheme of the second combination comprises adjusting an estimated signal to interference and noise ratio for the second combination, the adjusting of the estimated signal to interference and noise ratio for the second combination comprises adding, to a previously estimated signal to interference and noise ratio for the second combination, the adjustment based on the estimated error rate.

5. The method of claim 4, wherein:
   the previously estimated signal to interference and noise ratio for the first combination is a sum of:
      a first reference signal to interference and noise ratio, and
      an offset; and
   the adding of the adjustment to the previously estimated signal to interference and noise ratio for the first combination comprises adding the adjustment to the offset.

6. The method of claim 5, further comprising calculating the first reference signal to interference and noise ratio based on a signal to interference and noise ratio measured during reception of a beacon signal.

7. The method of claim 5, wherein the calculating of the adjustment comprises:
   determining whether:
      the estimated error rate is less than a target error rate,
      a current modulation coding scheme is equal to a maximum modulation coding scheme, and
      the offset exceeds a first threshold; and
   in response to determining that:
      the estimated error rate is less than the target error rate,
      the current modulation coding scheme is equal to the maximum modulation coding scheme, and
      the offset exceeds the first threshold,
   setting the adjustment to zero.

8. The method of claim 5, wherein the calculating of the adjustment comprises:
   determining whether:
      the estimated error rate is greater than a target error rate,
      a current modulation coding scheme is equal to a minimum modulation coding scheme, and
      the offset is less than a second threshold; and
   in response to determining that:
      the estimated error rate is greater than the target error rate,
      the current modulation coding scheme is equal to the minimum modulation coding scheme, and
      the offset is less than the second threshold,
   setting the adjustment to zero.

9. The method of claim 3, wherein the adjustment is calculated according to (1−PER)*snrStep/(1/targetPer−1)+PER*(−snrStep), wherein:
      PER is the estimated error rate,
      targetPer is a target error rate, and
      snrStep is an adjustment rate parameter.

10. The method of claim 9, wherein the estimated error rate is calculated as N2/(N1+N2).

11. The method of claim 9, wherein the target error rate is calculated based on a number of consecutive errors.

12. A system comprising a WiFi transmitter comprising a processing circuit, the processing circuit being configured to:
   adjust a respective estimated signal to interference and noise ratio for each of a plurality of combinations of spatial stream numbers and bandwidths;
   determine a modulation and coding scheme for each of the plurality of combinations;

estimate a plurality of throughputs, each corresponding to a respective one of the plurality of modulation and coding schemes;
select a maximum throughput from the plurality of throughputs; and
transmit data according to the modulation and coding scheme, spatial stream number, and bandwidth associated with the maximum throughput.

13. The system of claim 12 wherein the adjusting of the respective estimated signal to interference and noise ratio for a first combination of the plurality of combinations of spatial stream numbers and bandwidths comprises:
transmitting a first quantity of data, using the first combination;
receiving N1 acknowledgment signals, N1 being a nonnegative integer;
receiving N2 negative acknowledgment signals, N2 being a nonnegative integer; and
adjusting an estimated signal to interference and noise ratio for the first combination, based on N1 and N2.

14. The system of claim 13, wherein the adjusting of the estimated signal to interference and noise ratio comprises:
adding to a previously estimated signal to interference and noise ratio an adjustment based on an estimated error rate,
the adjustment being:
greater than zero when the estimated error rate is zero, and
less than zero when the estimated error rate is one.

15. The system of claim 14, wherein:
the number of spatial streams of a second combination of the plurality of combinations of spatial stream numbers and bandwidths, exceeds the number of spatial streams of the first combination, or
the bandwidth of the second combination exceeds the bandwidth of the first combination, and
the estimating of the throughput corresponding to the modulation and coding scheme of the second combination comprises adjusting an estimated signal to interference and noise ratio for the second combination,
the adjusting of the estimated signal to interference and noise ratio for the second combination comprises adding, to a previously estimated signal to interference and noise ratio for the second combination, the adjustment based on the estimated error rate.

16. The system of claim 15, wherein:
the previously estimated signal to interference and noise ratio for the first combination is a sum of:
a first reference signal to interference and noise ratio, and
an offset; and
the adding of the adjustment to the previously estimated signal to interference and noise ratio for the first combination comprises adding the adjustment to the offset.

17. The system of claim 16, wherein the processing circuit is further configured to calculate the first reference signal to interference and noise ratio based on a signal to interference and noise ratio measured during reception of a beacon signal.

18. The system of claim 16, wherein the calculating of the adjustment comprises:
determining whether:
the estimated error rate is less than a target error rate,
a current modulation coding scheme is equal to a maximum modulation coding scheme, and
the offset exceeds a first threshold; and
in response to determining that:
the estimated error rate is less than the target error rate,
the current modulation coding scheme is equal to the maximum modulation coding scheme, and
the offset exceeds the first threshold,
setting the adjustment to zero.

19. The system of claim 16, wherein the calculating of the adjustment comprises:
determining whether:
the estimated error rate is greater than a target error rate,
a current modulation coding scheme is equal to a minimum modulation coding scheme, and
the offset is less than a second threshold; and
in response to determining that:
the estimated error rate is greater than the target error rate,
the current modulation coding scheme is equal to the minimum modulation coding scheme, and
the offset is less than the second threshold,
setting the adjustment to zero.

20. A system comprising a WiFi transmitter comprising means for processing, the means for processing being configured to:
transmit a first quantity of data, using a first number of spatial streams, and a first bandwidth;
receive N1 acknowledgment signals, N1 being a nonnegative integer;
receive N2 negative acknowledgment signals, N2 being a nonnegative integer;
adjust an estimated signal to interference and noise ratio for the first number of spatial streams and the first bandwidth, based on N1 and N2;
estimate a first throughput for the first number of spatial streams and the first bandwidth;
estimate a second throughput for a second number of spatial streams and a second bandwidth;
determine whether the second throughput exceeds the first throughput; and
in response to determining that the second throughput exceeds the first throughput, transmit a second quantity of data, using the second number of spatial streams, and the second bandwidth.

* * * * *